(12) United States Patent
Aiello et al.

(10) Patent No.: US 6,991,376 B2
(45) Date of Patent: Jan. 31, 2006

(54) LOW PROFILE FLUID DYNAMIC BEARING MOTOR HAVING INCREASED JOURNAL SPAN

(75) Inventors: Anthony Joseph Aiello, Aptos, CA (US); Paco Gregor Flores, Felton, CA (US); Ali Khurram, Scotts Valley, CA (US); Klaus Dieter Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 10/702,946

(22) Filed: Nov. 5, 2003

(65) Prior Publication Data

US 2004/0096131 A1 May 20, 2004

Related U.S. Application Data

(60) Provisional application No. 60/424,226, filed on Nov. 5, 2002.

(51) Int. Cl.
*F16C 32/06* (2006.01)
(52) U.S. Cl. ....................... 384/107; 384/119
(58) Field of Classification Search ................ 384/100, 384/107, 111, 112, 113, 130, 132; 310/90; 360/99.08, 98.07
See application file for complete search history.

(56) References Cited

U.S. PATENT DOCUMENTS

| | | | |
|---|---|---|---|
| 5,142,173 A | | 8/1992 | Konno et al. |
| 5,357,162 A | | 10/1994 | Aiyoshizawa et al. |
| 5,423,612 A | | 6/1995 | Zang et al. |
| 5,533,811 A | * | 7/1996 | Polch et al. ................ 384/107 |
| 5,558,445 A | * | 9/1996 | Chen et al. ................ 384/132 |
| 5,941,644 A | * | 8/1999 | Takahashi .................. 384/112 |
| 6,154,339 A | | 11/2000 | Grantz et al. |
| 6,404,087 B1 | | 6/2002 | Ichiyama |
| 6,664,687 B2 | * | 12/2003 | Ichiyama ..................... 310/90 |
| 2003/0048577 A1 | * | 3/2003 | Kayama et al. .......... 360/99.08 |
| 2003/0190100 A1 | | 10/2003 | Grantz et al. |
| 2003/0214193 A1 | | 11/2003 | Aiello et al. |
| 2004/0032175 A1 | | 2/2004 | Grantz et al. |

OTHER PUBLICATIONS

U.S. Appl. No. 10/641,642, filed Aug. 14, 2003, entitled: "Motor Having a Fluid Dynamic Bearing With an Asymmetric Seal".

* cited by examiner

*Primary Examiner*—Thomas R. Hannon
(74) *Attorney, Agent, or Firm*—Morrison & Foerster LLP

(57) ABSTRACT

A fluid dynamic bearing motor is described. In one embodiment, the fluid dynamic bearing motor includes a stationary shaft having a first end coupled to a first plate and a second end coupled to a second plate. The motor also includes a hub that is configured to rotate relative to the shaft. A fluid dynamic journal bearing, disposed between the shaft and the hub, radially supports the relative rotation of the shaft. The motor further includes a first seal, which is defined in part by the first plate and is disposed radially outboard of the journal bearing, and a second seal, which is defined in part by the second plate and is disposed radially outboard of the journal bearing.

18 Claims, 4 Drawing Sheets

LOW PROFILE FLUID DYNAMIC BEARING MOTOR HAVING INCREASED JOURNAL SPAN

CROSS REFERENCE TO RELATED APPLICATIONS

This application claims the priority of U.S. Provisional Application Ser. No. 60/424,226, filed Nov. 5, 2002 by Aiello et al. (entitled "Large Journal Span Fluid Dynamic Bearing Motor"), which is herein incorporated by reference.

FIELD OF THE INVENTION

The present invention relates generally to fluid dynamic bearing motors, and relates more specifically to small form factor fluid dynamic bearing motors having limited journal spans.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks.

From the foregoing discussion, it can be seen that the bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres and comprise hydrodynamic grooves formed on the members themselves. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

Many current fluid dynamic bearing motor designs used in small form factor drives—that is, drives with stringent axial height constraints—suffer from insufficient angular stiffness due to the limited height/axial space available for journal bearing span. It is well known in the art that angular stiffness is a function of linear stiffness (i.e., radial stiffness in the journal bearing and axial stiffness in the thrust bearing) times a moment arm length (i.e., journal bearing span and thrust bearing diameter). Therefore, traditionally, angular stiffness shortcomings have been countered in disc drives by employing a large axial thrust bearing (i.e., increasing the moment arm length—or thrust bearing diameter—for axial stiffness) to augment the total bearing angular stiffness in cases where increasing the journal span is not possible. However, increasingly stringent power requirements in small disk drives make this option less efficient as large diameter thrust bearings consume more power.

Bearing drag is proportional to $3^{rd}$ and $4^{th}$ power functions of the radii of journal and thrust bearings, respectively, therefore it is more desirable from a power efficiency perspective to utilize the typically smaller diameter journal bearing for angular stiffness rather than the thrust bearing. Thus, it is desirable to maximize journal span beyond what is typically feasible in a traditional bearing design due to spatial constraints, thereby addressing the angular stiffness problem with a novel power efficient means.

SUMMARY OF THE INVENTION

A stationary shaft design with two plates affixed to or integrated with it at each of its ends supports a rotating hub on fluid bearings between the plates and thereby attaches to both the top cover and base on the outside surfaces of these plates. Connection to both the top cover and base significantly improves structural system stiffness while compromising little axial space due to the shaft-plate configuration. The axial space yielded in turn is used to separate the two journal bearings or lengthen a single journal bearing such that their increased span results in an unusually large moment arm length and subsequent improved bearing angular stiffness which is critical in short height motor designs. This also reduces the dependence on the less efficient thrust bearing(s) for angular stiffness such that they are primarily used to provide less critical axial stability. In a preferred embodiment, a recirculation channel is introduced between the two capillary seals to provide for purging of air from the bearing lubricant to the outside environment and to ensure by its placement that neither seal is drained by a bearing-tolerance-induced net flow. Any combination of conventional and radial capillary seals can be used with this design.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
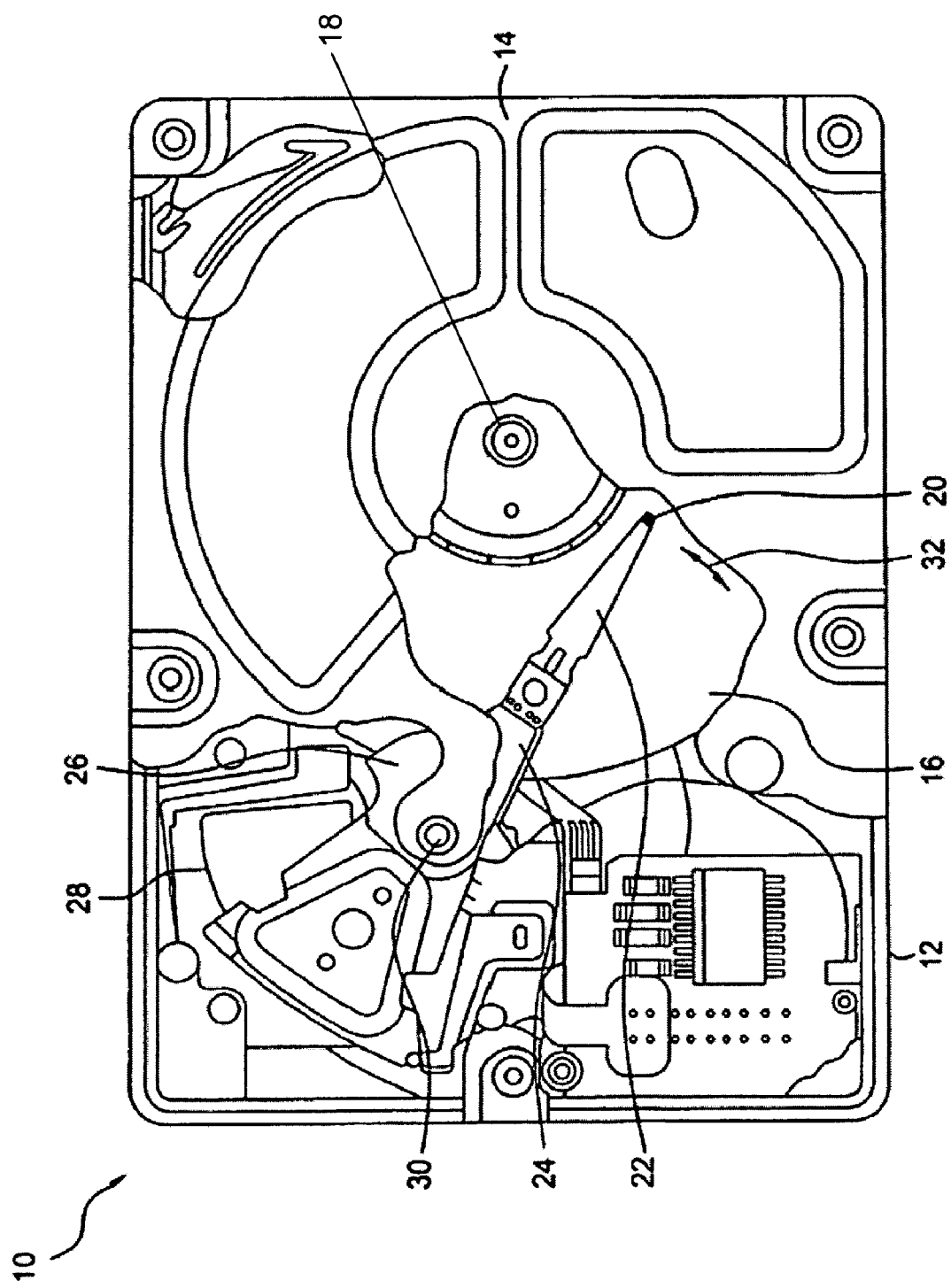
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
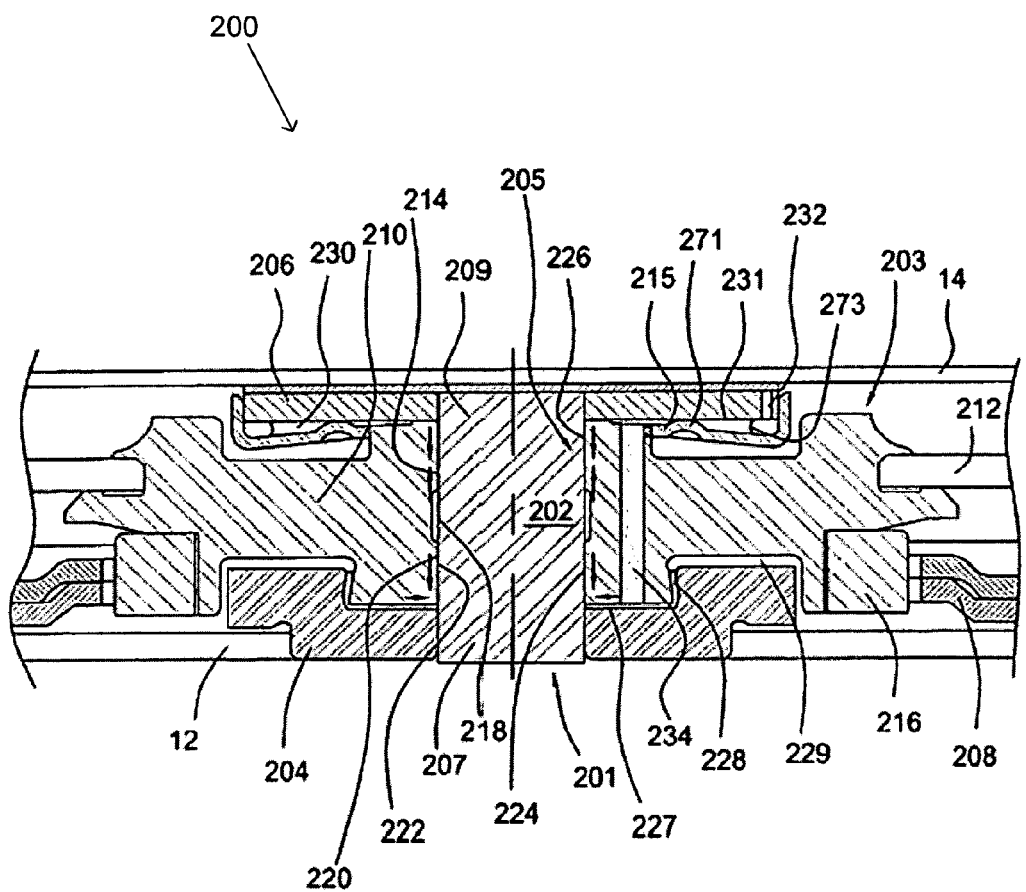
FIG. 2 depicts a side sectional view of one embodiment of a fluid dynamic bearing motor according to the present invention.

FIG. 2 illustrates a cross sectional view of a fluid dynamic bearing motor 200. The motor 200 comprises a stationary assembly 201, a rotating assembly 203, and a bearing assembly 205 for supporting relative rotation of the hub and shaft.

The stationary assembly 201 comprises a shaft 202 having a first end 207 and a second end 209. The first end 207 is attached to a bottom plate 204, which is attached to a base 12, for example by pressure sensitive adhesive (but attachment may also be accomplished by regular epoxy or other attachment devices). The second end 209 is likewise attached to a top plate 206, which is attached to a cover 14. Attachment to the base 12 and cover 14 significantly improves structural system stiffness, while compromising little axial space. A stator 208 is supported on the base 12 and comprises a plurality of "teeth" formed of a magnetic material (for example, steel) and wound with a winding or wire.

The rotating assembly 203 comprises a hub 210 rotatably supported on the shaft 202 between the bottom plate 204 and the top plate 206. The hub 210 supports one or more disks 212 for rotation. A cylindrical bore 214 is formed through the middle of the hub 210 for receiving the shaft 202. A magnet 216 is mounted to the hub 210 and cooperates with the stator 208 to induce rotation of the hub 210 about the shaft 202.

The bearing assembly 205 is formed in a journal area (or gap) 218 defined by the facing surfaces of the inner diameter 220 of the bore 214 and the outer diameter 222 of the shaft 202. The journal 218 is filled with a fluid such as air or oil. Within the journal 218 illustrated are first and second bearing surfaces 224, 226, respectively, that help to pressurize the fluid in the journal 218, although alternate bearing configurations may be used with equally effective results. For example, a single journal bearing or multiple bearings could also be used.

The first bearing surface 224 is located proximate the first end 207 of the shaft 202, while the second bearing surface 226 is located proximate the second end 209 of the shaft 202. Because attaching the shaft 202 to the base 12 and cover 14 through plates 204 and 206, respectively, creates additional journal space for the bearing surfaces 224, 226, the bearing surfaces may be separated so that their increased span over the journal results in a large moment arm length. The relocation of the seals 228 and 230 to positions radially adjacent the journal 218 also diminishes the allocation of axial length to the sealing function, thereby allowing a longer journal span. The increased journal span moment arm length results in improved angular stiffness in the bearing assembly 205, which is especially critical in motors having short axial heights. In order to provide the necessary axial support, at least one thrust bearing 227 is provided, comprising a grooved region on a surface of either hub 210 or bottom plate 204. To prevent fluid loss, the thrust bearing 227 preferably pumps toward the journal bearing 224, as shown. The thrust bearing 227 could be disposed at either end of the journal, or both, depending on design goals. As described in further detail herein, embodiments that include only one thrust bearing may require an axial bias force imposed on hub 210 to maintain bearing alignment.

At least one of the journal bearings 224, 226 is preferably asymmetric to establish bearing fluid circulation through recirculation channel 234. Such recirculation, among other things, enables any air bubbles trapped in the fluid to be purged through the seals 228, 230 at either axial end of bearing system.

A reversed axial centrifugal capillary seal 228 is located proximate the first bearing surface 224 and is defined between the hub 210 and the bottom plate 204. The seal 228 is oriented substantially parallel to the shaft 202. In addition, a labyrinth 229 between the hub 210 and bottom plate 204 proximate the seal 228 reduces the rate of fluid evaporation.

A radial capillary seal 230 is located proximate the second bearing surface 226 and is defined between the top plate 206 and a shield 215 and is oriented substantially perpendicular to the shaft 202. In addition, the radial capillary seal 230 defines a large fluid reservoir 231 that is initially filled through a vent hole 232. The reservoir 231 is maintained by the diverging surfaces of the top plate 206 and shield 215; the desired spacing is established by a dimple 271 on the shield, and a meniscus 273 retains the fluid in the reservoir. The radial capillary seal is described in further detail below in conjunction with FIG. 3A.

The capillary seals 228, 230 are coupled to one another at least one fluid recirculation channel 234, which extends through the hub 210. By so positioning the recirculation channel 234, any net fluid flow in the bearing assembly 205 will protect the seals 228, 230 from turbulence and pressure gradients that can either pump the seals dry or cause them to overflow. As the fluid circulates, air bubbles entrained in the fluid will be carried along by the circulation and exit through the seal (typically seal 230). Persons skilled in the art will recognize that seals are not required where the bearing fluid comprises air.

Figure 3A:
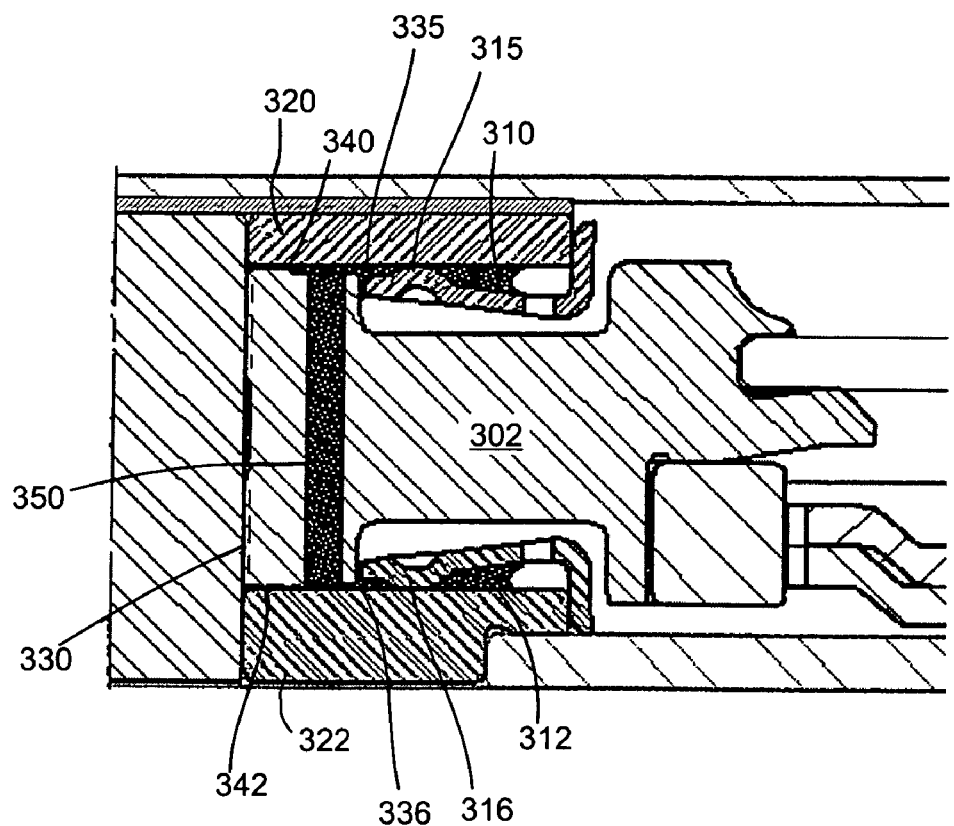
FIGS. 3A and 3B are sectional views of alternate sealing configurations.

Although sealing in the motor 200 is accomplished by a combination of centrifugal and radial capillary seals 228, 230 at first and second shaft ends 207, 209, respectively, any combination of these seals, as well as other sealing means, may be used where permitted by space and life requirements. Thus FIG. 3A illustrates the use of radial capillary seals 310, 312 in combination with top plate 320 and bottom plate 322, respectively.

As previously described, radial capillary seal 310 is defined between diverging surfaces of the top plate 320 and a first shield 315, and radial capillary seal 312 is defined between diverging surfaces of the bottom plate 322 and a second shield 316. Radial capillary seals 310, 312 are configured to act as high-volume bearing fluid reservoirs. First shield 315 and second shield 316 are configured to protect radial capillary seals 310, 312, respectively, from losing bearing fluid under shock conditions. FIG. 3A further shows that a first annular seal 335 is defined between the inner diameter of the first shield 315 and the hub 302, and a second annular seal is defined between the inner diameter of the second shield 316 and the hub 302. Each of the first and second annular seal 335, 336 is configured with a narrow gap, providing each seal with a relatively high stiffness. The high stiffness of each of the first annular seal 335 and the second annular seal 336 provides each seal with shock robustness such that it does not lose bearing fluid under shock conditions.

Each radial capillary seal 310, 312 also is coupled to the journal bearing gap region 330 by a plenum 340, 342, respectively. Notably, the first annular seal 335 and the plenum 340 are configured such that the gap between the top plate 320 and the hub 302 narrows as the gap extends radially inward towards the journal 330. Likewise, the second annular seal 336 and the plenum 342 are configured such that the gap between bottom plate 322 and the hub 302 narrows as the gap extends radially inward towards the journal 330. As persons skilled in the art will understand, capillary forces around the first annular seal 335 and within plenum 340 and around the second annular seal 336 and within plenum 342 cause bearing fluid contained in radial capillary seals 310, 312, respectively, to feed into the journal 330. Finally, bearing fluid circulation is accommodated by a recirculation channel 350.

Figure 3B:
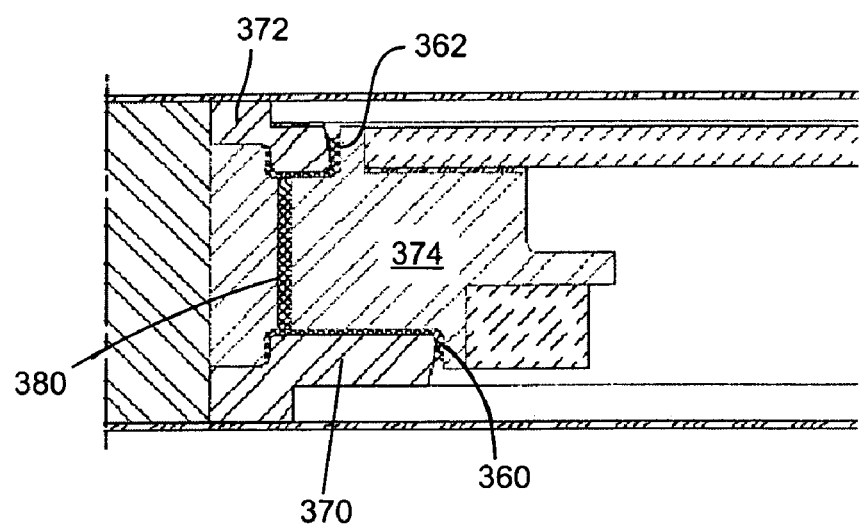

A further alternative in FIG. 3B teaches the use of an axial capillary seal at either end of the journal, oriented substantially parallel to the journal bearing. Each seal 360, 362 is defined by diverging surfaces of bottom plate 370 and top plate 372, respectively, and hub 374. Note that the recirculation channel 380 is preferably radially well inboard of the capillary seals 360, 362 to minimize the effects of pressure gradients on the seals.

Figure 4:
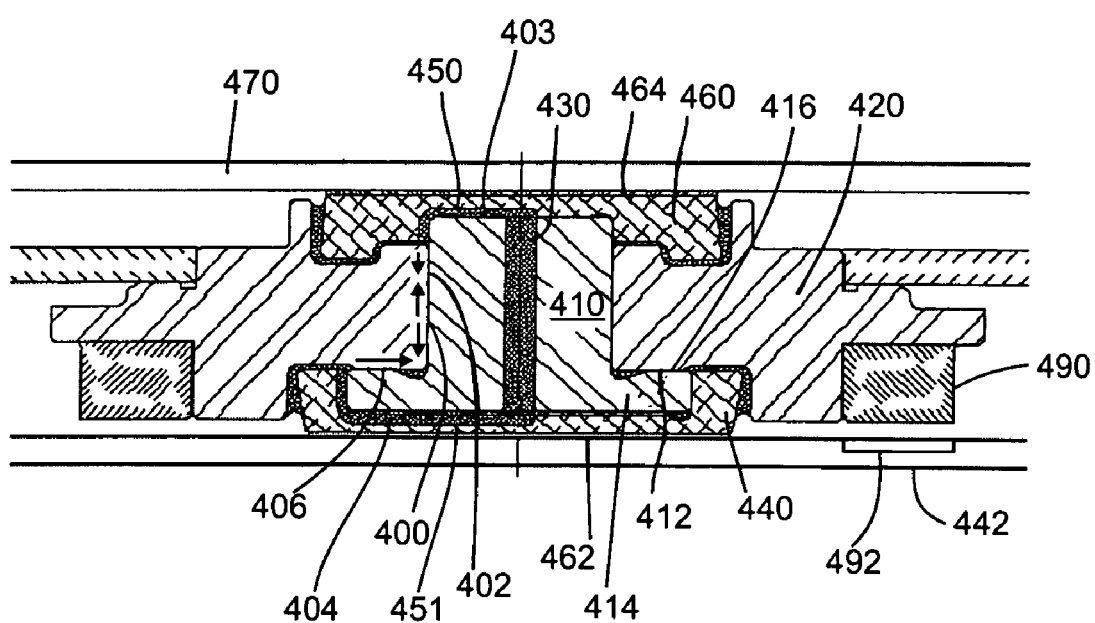
FIG. 4 depicts a sectional view of an alternate embodiment of the invention.

FIG. 4 illustrates an alternative embodiment that illustrated in FIG. 2. In FIG. 4, journal bearings 400 and 402 are provided to establish radial support, and a thrust bearing 406 is provided at at least one end of the shaft 410 between the axial surface 412 of a flange 414 of the shaft 410 and a facing axial surface 416 of the hub 420 to establish axial support. Rather than provide for a recirculation channel through the hub, in this embodiment, the recirculation channel 430 extends axially through the shaft 410. In addition, radial portions 403, 403 of the overall recirculation path may then be defined between the shaft 410 and a grooved section 450 of the top plate 460 and a grooved section 451 of a bottom plate 440, respectively. (Persons skilled in the art will recognize that in alternative embodiments shaft 410 may include the grooved sections that comprise the radial portions 403, 404 of the recirculation path.) In such a configuration, the overall recirculation path is stationary rather than moving such that the recirculation path is not subjected to centrifugal forces.

In this embodiment as well as the previously described embodiments, the motor attachment to the base 442 and top cover 470 are typically with a pressure sensitive adhesive (PSA) and/or a regular epoxy over a large diameter sheer area 462, 464 of each of plates 440, 460 facing the base 442 and top 470, respectively, to increase overall stiffness in the motor assembly. Other means of attachment would work well when permitted by axial and radial spatial constraints.

One should note that in this embodiment, as well as the embodiment of FIGS. 2 and 3A and 3B, that the single thrust bearing may require a constant magnetic bias force pulling the hub down to maintain the precise alignment of the bearings. This is typically achieved by offsetting the stator 208 from the magnet 216, as shown in FIG. 2, or by providing a magnetic material 492 inserted in the base for 442 to generate a downward acting magnetic force between the magnet 490 and the magnetic material 492, as shown in FIG. 4 (or by providing a separate magnet supported from the hub 420 and cooperating with the magnetic material 492). Such a configuration allows lower precision tolerances on one of the two plates 440, 460.

Alternatively, two thrust bearings without magnetic bias can be used, but greater precision is then required in manufacturing and assembling the plates.

The features of the disclosed designs include a long journal span for better angular stiffness and an option for implementing the design using a single thrust bearing with a magnetic bias force for low power consumption and simplified manufacturing. Using a small diameter shaft, which is enabled by all the above designs, especially the designs of FIGS. 2, 3A and 3B, results in lower power consumption. Further, the top cover attachment provides enhanced overall stiffness.

It can also be seen in the above figures that a radial capillary seal with a large reservoir for extended life at the end of the motor attached to the top cover and a simpler centrifugal capillary seal at the bottom end is a preferred arrangement. The bottom seal is typically associated with a labyrinth along the hub to reduce the evaporation rate. However, as shown in the figures above including FIGS. 3A and 3B, any combination of these sealing means is allowed where permitted by life and space requirements.

It is also important to note that at least one recirculation channel is provided between the bearings and seals. As a result, the net flow in the bearing assembly protects the seals from turbulence and pressure gradients that could either pump the seals dry or cause them to overflow. Bearing fluid recirculation also provides a means for causing air bubbles entrained in the fluid to be ejected from the system.

Other features and advantages of the invention will be apparent to a person of skill in the art who studies the disclosure. Therefore, the scope of the invention will be limited only by the following claims.

What is claimed is:

1. A fluid dynamic bearing motor, comprising:
   a stationary shaft having a first end coupled to a first plate and a second end coupled to a second plate;
   a hub configured to rotate relative to the shaft;
   a fluid dynamic journal bearing disposed between the shaft and the hub and configured to radially support the relative rotation of the hub;
   a first seal partially defined by the first plate and disposed radially outboard of the journal bearing;
   a second seal partially defined by the second plate and disposed radially outboard of the journal bearing; and
   a fluid dynamic thrust bearing disposed radially inboard of the first seal between the hub and the first plate and configured to axially support the relative rotation of the hub, wherein the journal bearing and the thrust bearing are configured to pump bearing fluid towards one another.

2. The fluid dynamic bearing motor of claim 1, wherein the first plate is attached to a top cover.

3. The fluid dynamic bearing motor of claim 1, wherein the second plate is attached to a base.

4. The fluid dynamic bearing motor of claim 1, further comprising a recirculation channel extending axially through the hub and fluidly coupled to the first seal and the second seal.

5. The fluid dynamic bearing motor of claim 4, wherein the recirculation channel is disposed radially inboard of the first seal and the second seal and radially outboard of the journal bearing.

6. The fluid dynamic bearing motor of claim 5, wherein the first seal comprises a capillary seal defined between diverging walls of the first plate and the hub.

7. The fluid dynamic bearing motor of claim 6, wherein the capillary seal is coupled to a labyrinth configured to reduce the rate of evaporation of bearing fluid contained in the capillary seal.

8. The fluid dynamic bearing motor of claim 6, wherein the capillary seal is a centrifugal capillary seal.

9. The fluid dynamic bearing motor of claim 1, further comprising a fluid dynamic thrust bearing disposed radially inboard of the second seal between the hub and a flange of the shaft and configured to axially support the relative rotation of the hub.

10. The fluid dynamic bearing motor of claim 9, wherein the journal bearing and the thrust bearing are configured to pump bearing fluid towards one another.

11. The fluid dynamic bearing motor of claim 1, further comprising a magnet attached to the hub and a stator, the magnet and the stator being axially offset to produce an axial bias force acting on the hub.

12. The fluid dynamic bearing motor of claim 1, further comprising a magnet attached to the hub and magnetic material coupled to a base, the magnet and magnetic material being disposed relative to one another to produce an axial bias force acting on the hub.

13. The fluid dynamic bearing motor of claim 1, further comprising a second fluid dynamic journal bearing disposed between the shaft and the hub and configured to radially support the relative rotation of the hub.

14. A fluid dynamic bearing motor comprising:
a stationary shaft having a first end coupled to a first plate and a second end coupled to a second plate;
a hub configured to rotate relative to the shaft;
a fluid dynamic journal bearing disposed between the shaft and the hub and configured to radially support the relative rotation of the hub;
a recirculation channel extending axially through the hub and fluidly coupled to the first seal and the second seal, disposed radially inboard of the first seal and the second seal and radially outboard of the journal bearing;
a first seal partially defined by the first plate and disposed radially outboard of the journal bearing, wherein the first seal comprises a radial capillary seal; and
a second seal partially defined by the second plate and disposed radially outboard of the journal bearing.

15. The fluid dynamic bearing motor of claim 14, further comprising a shield attached to the first plate, the shield partially defining the radial capillary seal and having a dimple configured to establish the spacing between diverging surfaces of the first plate and the shield that define the radial capillary seal.

16. The fluid dynamic bearing motor of claim 15, wherein the radial capillary seal comprises an annular seal and a relatively larger reservoir seal defined between the diverging surfaces of the first plate and the shield.

17. The fluid dynamic bearing motor of claim 16, wherein the annular seal is defined between an inner diameter of the shield and the hub.

18. A fluid dynamic bearing motor comprising:
a stationary shaft having a first end coupled to a first plate and a second end coupled to a second plate;
a hub configured to rotate relative to the shaft;
a fluid dynamic journal bearing disposed between the shaft and the hub and configured to radially support the relative rotation of the hub;
a first seal partially defined by the first plate and disposed radially outboard of the journal bearing;
a second seal partially defined by the second plate and disposed radially outboard of the journal bearing; and
a recirculation channel extending through the shaft and coupled to the first seal via a first radially extending portion of a recirculation path and to the second seal via a second radially extending portion of the recirculation path.

* * * * *